Dec. 25, 1934. E. L. VAIL 1,985,873
COMBINED REAR VISION MIRROR AND CLOCK
Filed Jan. 18, 1932  2 Sheets—Sheet 1
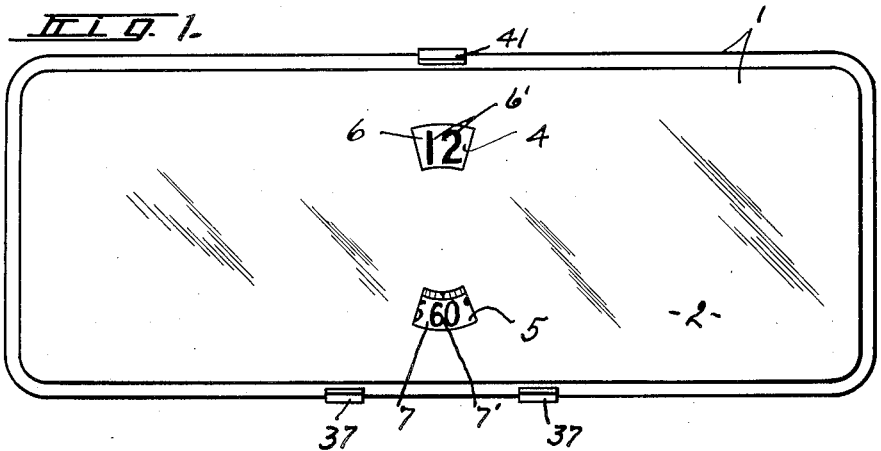
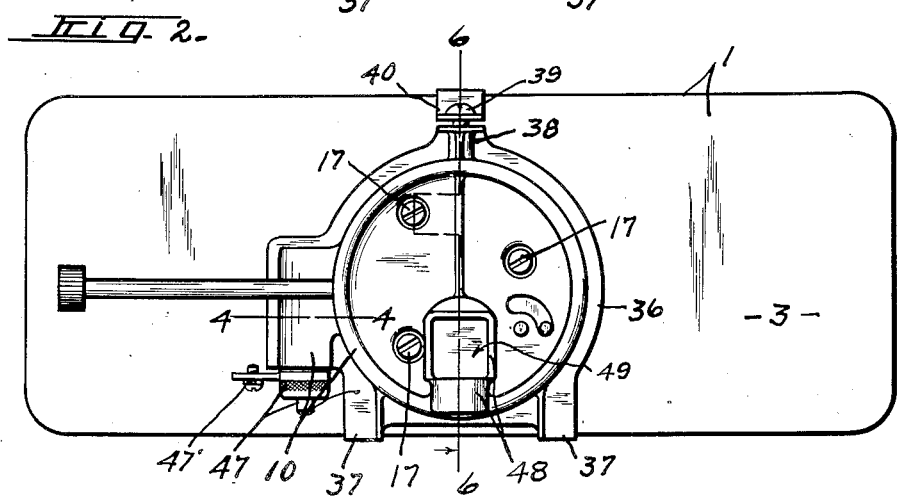
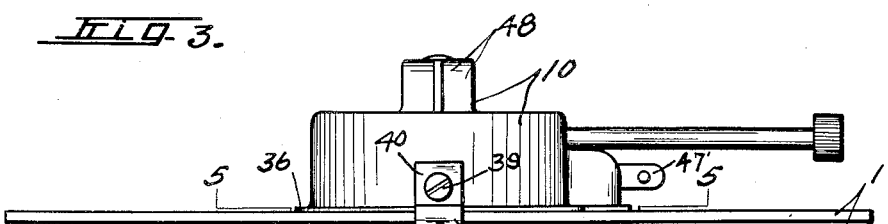
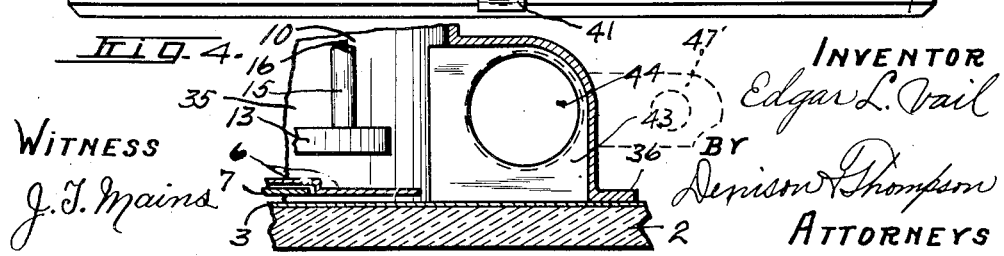
INVENTOR
Edgar L. Vail
BY
Denison Thompson
ATTORNEYS
WITNESS
J. T. Mains

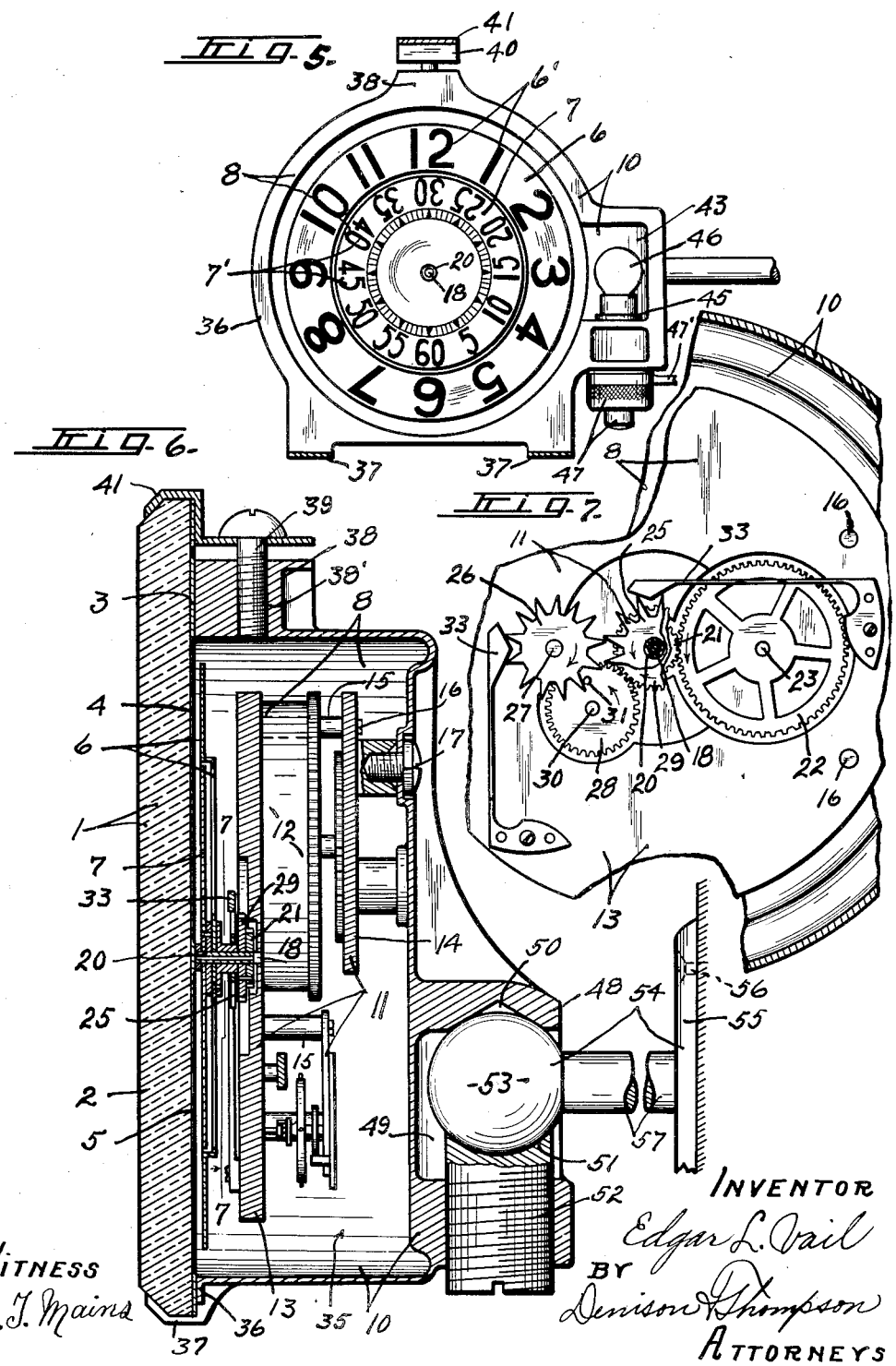

Patented Dec. 25, 1934

1,985,873

UNITED STATES PATENT OFFICE 1,985,873

COMBINED REAR VISION MIRROR AND CLOCK

Edgar L. Vail, New York, N. Y.

Application January 18, 1932, Serial No. 587,263

3 Claims. (Cl. 58—56)

This invention relates to improvements in combined rear vision mirror and clock suitable for use on motor vehicles such as automobiles, buses and the like.

The main objects of this invention are to provide a combined rear vision mirror and a timepiece which may be readily secured to a vehicle at any convenient place such as to the windshield which will present a neat and attractive appearance and whereby the time of day may be quickly and easily determined from a considerable distance such as from the rear seat of an automobile and wherein the time may be readily ascertained at night as well as in the daytime.

In carrying out these objects, I have provided a clock case adapted to be secured to a rear vision mirror and to support the clock at the rear of the mirror. I have provided the clock case with a suitable bracket for attaching it to a motor vehicle in such a manner that the mirror may be tilted relative to the bracket and support for the bracket.

Another feature of this invention is the utilization of what is commonly known as a "jump" clock mechanism comprising a pair of rotary disks or dials which are provided with suitable characters for indicating the hours and minutes respectively.

Still another feature of this invention is to provide the glass of the mirror with a pair of transversely spaced transparent portions or sight openings arranged substantially at equal distances either side of the center of the mirror face and to position the clock with the hour and minute dials registering with a respective sight opening so that a restricted portion of each dial may be observed through the glass of the mirror so that only the characters on the dials denoting the time of day are visible.

Other objects and advantages pertaining to the structure and form of the clock case and the manner of securing the same to the mirror and to a vehicle, together with other features of construction, will be more apparent from the following description, taken in connection with the accompanying drawings, in which:—

Figure 1 is a face view of a combined rear vision mirror and clock embodying the various features of this invention.

Figure 2 is a rear view of the device shown in Figure 1.

Figure 3 is a plan view of this device.

Figure 4 is an enlarged detail sectional view taken on line 4—4, Figure 2.

Figure 5 is a sectional view taken on line 5—5, Figure 3, showing nearly all of the clock case and dials in elevation.

Figure 6 is an enlarged transverse sectional view taken on line 6—6, Figure 2.

Figure 7 is a detail sectional view taken on line 7—7, Figure 6, illustrating a portion of the drive mechanism for the dials.

The device, as illustrated in the drawings consists of a mirror 1 composed of a rectangular plate of glass 2 having one face thereof covered with the usual backing 3. Portions of this backing 3 are removed to form transparent portions or sight openings 4 and 5 arranged in transverse spaced relation at substantially equal distances either side of the center of the glass.

These openings 4 and 5 may be of any suitable size or outline to disclose the characters on the respective dials as 6 and 7 respectively of a clock 8 positioned at the rear of the mirror, and in this instance, are made substantially concentric with said dials.

The clock 8 herein shown, is of the jump hour type and consists of a case 10 of novel construction presently described and having mounted therein a suitable clock mechanism 11 consisting of a suitable train of gears, not herein necessary to fully illustrate, and a spring motor as 12 for actuating said gears, all of which are operably supported in the usual manner by a pair of bearing supporting frames or plates 13 and 14 secured together in parallel spaced relation by a plurality of conveniently located spacing sleeves 15 and screws 16.

This clock mechanism is secured to the case 10 by means of a plurality of, in this instance three, screws 17 which extend through corresponding openings in the rear wall of the case 10 and are screw-threaded in the rear plate as 14 comprising a portion of the clock mechanism.

The forwardly positioned supporting plate 13 has secured thereto a supporting shaft or stud 18 which extends forwardly therefrom and has rotatably mounted thereon the dials 6 and 7. These dials 6 and 7 are arranged in concentric relation near the outer end of the supporting shaft 18 with the smaller dial as 7 provided with suitable characters 7' arranged in circumferential spaced relation near the outer edge of the dial for indicating the minutes of the hour and which will, therefore, be called the minute dial. This dial 7 is secured to a rearwardly extending sleeve 20 which is rotatably mounted on the shaft 18 and has secured to the rear end thereof a pinion 21 which is in meshing engagement with a relatively large drive gear 22 mounted on a shaft 23 which is journaled in the supporting frames 13 and 14 and which is continuously rotated in the usual manner by the spring motor 12, not herein necessary to illustrate or further describe, as it constitutes no part of this invention.

The other dial 6 is provided on its front face with suitable characters as 6' arranged in circumferential spaced relation near the outer edge thereof for designating the hours of the day, and will therefore, be designated the hour dial. This dial 6 is positioned at the rear of the minute dial 7 and has the portion of the periphery which extends beyond the minute dial 7 extended forwardly so as to lie in the plane of the minute dial.

This hour dial 7 is rotatably mounted upon the sleeve 20 and is intermittently driven the distance between two adjacent characters 6' or 1/12th of a revolution by means of a pair of relatively large toothed gears 25 and 26. One of the gears as 25 is secured to the dial 6 to rotate therewith, while the other gear as 26 is rotatably mounted on a stud 27 secured to the adjacent frame 13. These gears 25 and 26 are, in turn, intermittently driven one tooth space by a pair of constantly rotating gears 28 and 29.

One of these gears as 29 is mounted upon the sleeve 20 for movement therewith, while the other gear 28 is rotatably mounted upon a stud 30 which is secured to the frame 13 and is provided with a drive pin 31 which extends outwardly from one face thereof and is adapted to engage a tooth of the gear 26 during each revolution thereof for intermittently rotating said gear.

Each of the intermittently driven gears 25 and 26 may be, as shown in Figure 7, yieldingly maintained against rotation by respective spring members 33 secured at one end to the frame 13.

My novel clock case 10, as illustrated, consists of a die casting having an annular recess 35 provided in the forward face thereof adapted to contain the actuating clock mechanism 11 and dials 6 and 7 of the clock just described.

The case 10 has the front edge thereof provided with a substantially annular outwardly extending flange 36 adapted to engage the rear face of the mirror and which at one side, is extended to form a pair of spaced fingers 37 adapted to engage one edge of the glass 2 of the mirror. These fingers 37 may be of any required length for positioning the characters on the dials 6 and 7 in registration with the respective sight openings 4 and 5 provided in the mirror 1, and it is also obvious that these fingers may be adapted to readily engage the edges of mirrors of different outlines or contours for securing the mirror to the case.

The case 10 is also provided with an outwardly extending boss 38 arranged substantially opposite to the fingers 37 and which has a threaded opening 38' therein for receiving a clamping screw 39. This screw 39 is for the purpose of adjustably securing to the case 10, a clamping bracket 40 which has one edge thereof provided with a suitable bent finger 41 for extending over the opposite edge of the mirror glass 2.

It is thus seen that by manipulating the screw 39, mirrors of different outlines and dimensions may be readily secured to the case 10 in such a manner as to utilize the mirror glass to tightly cover the face of the clock case with the characters on the dials 6 and 7 registering with a respective sight opening 4 and 5, in which case the crystal of the clock may be omitted.

In order that the face of each dial 6 and 7 may be artificially illuminated when desired, I have extended the peripheral wall of the case 10 at one side thereof to form a lamp chamber 43 positioned at one side of the recess 35 and which is in communication with the outer portion of said recess, as illustrated more particularly in Figure 4.

The lower horizontal wall of the chamber 43 is provided with a suitable aperture 44 for receiving therein a lamp socket 45 adapted to support an electric lamp 46 as illustrated in Figure 5, and which lamp may be connected in any well-known manner to a source of potential not shown, so that light rays thrown off by the lamp will pass between the disks 6 and 7 and the mirror 1 so as to artificially illuminate the front faces of the dials and the characters thereon to enable said characters registering with the respective sight openings in the mirror to be readily seen through the glass of the mirror. In order that the operation of the lamp 46 may be readily controlled, I have provided a suitable switch member 47 secured to or made integral with the lamp socket 45 and which is provided with an outwardly extending arm or terminal member 47' to which the positive feed wire may be secured.

The case 10 is also provided with an outwardly extending boss 48 made integral with the rear wall of the case and which is provided with a recess or chamber 49 extending inwardly from the rear wall thereof. This chamber has the upper wall thereof provided with a concave socket 50 which co-operates with a similar concave socket 51 provided in the inner end of a screw 52 screw-threaded in the opposite or lower wall of the recess co-axially with the recess 50 for frictionally securing therebetween the spherical head 53 of a supporting bracket 54.

This bracket 54, in this instance, consists of a foot plate 55 adapted to be secured by screws 56 or other suitable means to a convenient portion of a motor vehicle and which is connected with the spherical head 53 by a reduced shank portion 57.

Although I have shown and particularly described the preferred embodiment of my invention, I do not wish to be limited to the exact construction shown, as various changes in the form and the relation of the parts thereof may readily be made without departing from the spirit of this invention, as set forth in the appended claims.

I claim:

1. A device of the class described comprising in combination a rear view mirror, a clock case having an open front, means for securing the mirror to the case including fingers integral with the case projecting over one edge of the mirror, a clamping member projecting over the opposite edge of the mirror, and means adjustably securing said clamping member to the clock case whereby the mirror will extend across the open front of the case to form a crystal for the clock mechanism contained therein, and means adjustably connected with the case for securing the case and mirror to a vehicle.

2. A device of the class described comprising in combination a rear view mirror having a pair of spaced unsilvered portions forming sight openings, a jump clock mechanism including two rotary dials, one bearing hour indicating indicia and the other bearing minute indicating indicia, a case for the clock mechanism having an open front, said case being provided with fingers projecting over the edge of the mirror for securing said mirror to the case at the open front thereof with a portion of the dials visible through a respective sight opening whereby the indicia are visible from the front of the mirror during the rotation of the dials, and means connected with the case for securing the case and mirror to a vehicle.

3. A combined rear vision mirror and clock comprising a rear vision mirror having a small portion of the back thereof unsilvered, a clock mechanism including time indicating means, a casing for the clock mechanism having an open front, said casing being provided with fingers projecting over the edge of the mirror for securing said mirror to the case at the front thereof with said time indicating means visible through the unsilvered portion of the back, and means connected with the casing for adjustably securing the combined clock and mirror to a vehicle.

EDGAR L. VAIL.